United States Patent [19]

Geaslin

[11] 4,191,329
[45] Mar. 4, 1980

[54] SINGLE-PIPE HOT WATER SOLAR SYSTEM
[75] Inventor: William E. Geaslin, Lubbock, Tex.
[73] Assignee: Solartech Systems Corporation, Lubbock, Tex.
[21] Appl. No.: 897,291
[22] Filed: Apr. 17, 1978
[51] Int. Cl.$^2$ .............................................. F24J 3/02
[52] U.S. Cl. .................................... 126/427; 126/442
[58] Field of Search ................. 126/270, 271; 237/1 A
[56] References Cited

U.S. PATENT DOCUMENTS

| | | | |
|---|---|---|---|
| 3,960,136 | 6/1976 | Moan et al. | 237/1 A |
| 3,977,601 | 8/1976 | Bearzi | 237/1 A |
| 4,004,574 | 1/1977 | Barr | 126/271 |
| 4,010,734 | 3/1977 | Chayet | 237/1 A |
| 4,019,495 | 4/1977 | Fraizer et al. | 237/1 A |
| 4,034,738 | 7/1977 | Barber, Jr. | 237/1 A |
| 4,060,195 | 11/1977 | Rapp, Jr. et al. | 237/1 A |
| 4,126,122 | 11/1978 | Bross | 237/1 A |
| 4,133,338 | 1/1979 | Honikman | 237/1 A |
| 4,134,544 | 1/1979 | Thomason et al. | 126/271 |

Primary Examiner—Henry C. Yuen
Attorney, Agent, or Firm—Wendell Coffee

[57] ABSTRACT

A hot water solar system receives water from a source and heats it in solar panels. From the solar panels it is circulated through a supplemental heater and through a domestic heating system and thus made available for domestic use in washers and baths and is then recirculated through the solar panels. In the event the solar panels will not increase the temperature of the water 1.5° C. the water is not circulated through the solar panels but merely circulated back through the supplemental heater and the household loop. In the event the water in the solar panels approach a freezing temperature, water may be circulated from the household loop to the solar panels to prevent freezing. Water is also circulated from a solar storage tank through the solar panels at a varying rate depending upon the amount of temperature increase in the water through the solar panels. A higher flow rate of water being circulated through the panels if the temperature rise is higher. Also, water is circulated through the solar storage tank in the event it approaches freezing temperature.

9 Claims, 1 Drawing Figure

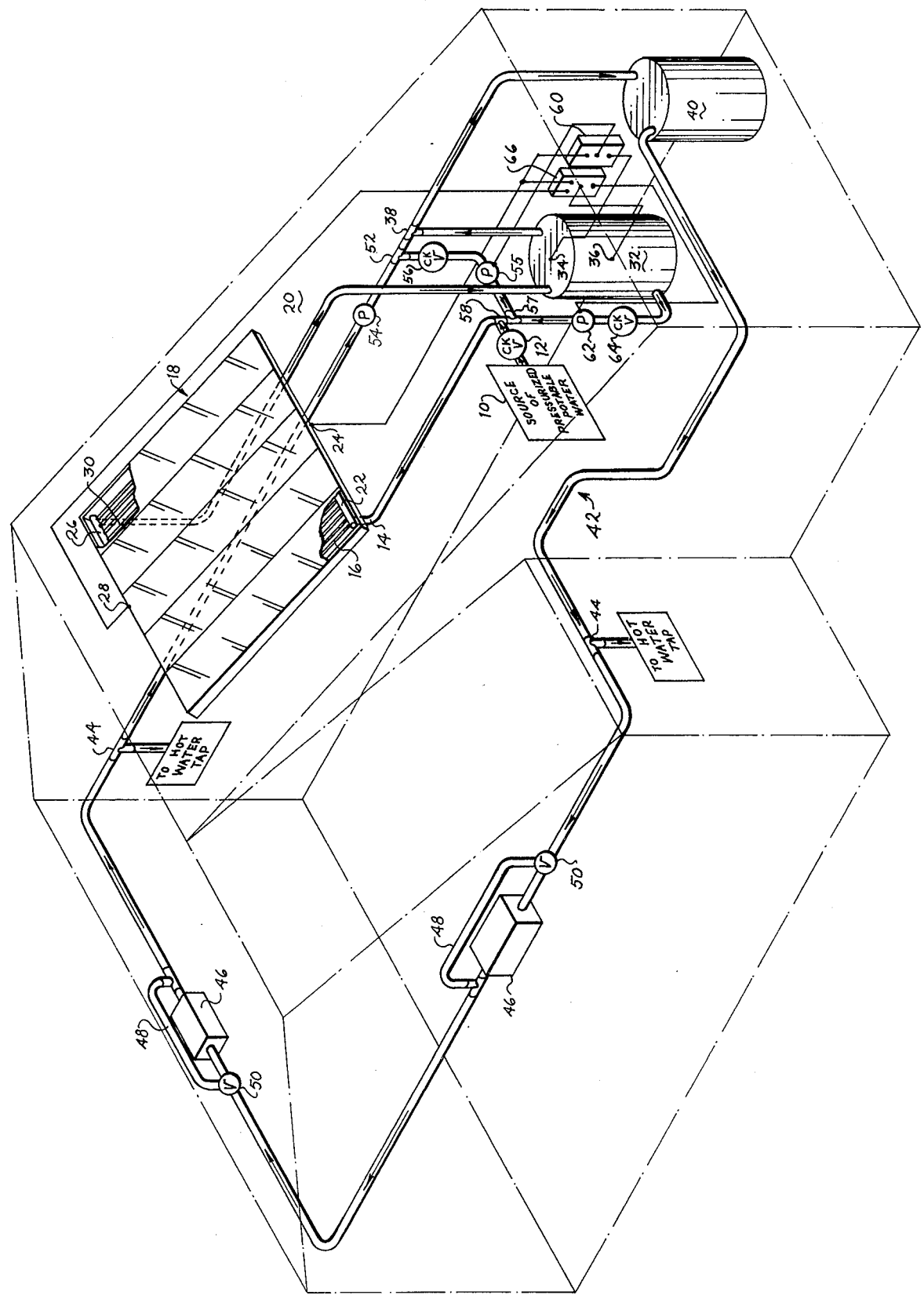

SINGLE-PIPE HOT WATER SOLAR SYSTEM

CROSS REFERENCE TO RELATED APPLICATIONS

This application does not claim priority to any prior filed application; however, a patent application for Solar Panels by the same inventor is filed concurrently herewith and bears Ser. No. 897,290.

BACKGROUND OF THE INVENTION (1) Field of the Invention

This invention relates to stoves and furnaces and more particularly to solar water heaters.

(2) Description of the Prior Art

Many inventors have worked with the problem of heating homes and furnishing hot water for domestic use in homes and other buildings.

Applicant caused a search to be made of the prior art before filing this application and the following prior art was discovered therein.

Moan U.S. Pat. No. 3,960,136
Estes U.S. Pat. No. 3,961,619
Bearzi U.S. Pat. No. 3,977,601
Balkus U.S. Pat. No. 4,003,364
Barr U.S. Pat. No. 4,004,574
Chayet U.S. Pat. No. 4,010,734
Huse U.S. Pat. No. 4,050,445
Ervin U.S. Pat. No. 4,054,126
Horwitz U.S. Pat. No. 4,055,055
Jones U.S. Pat. No. 4,055,161
Bohanon U.S. Pat. No. 4,061,131
Ashton U.S. Pat. No. 4,061,132

BARR discloses an invention where he uses the same water in the heat collector as is used in heat transfer coils which heat the air or ductwork. Most of the prior art as seen from these patents do not use the same fluid in the heat collectors exposed to solar radiation as is used either for the domestic water in the baths, lavatories or washers within the home or for the water in space heaters.

SUMMARY OF THE INVENTION (1) New and Different Function

I have developed a system wherein the same potable water from the source of supply is used to circulate through the solar panels to absorb the heat from the solar radiation and this same water is used for the domestic hot water supply for purposes of the clothes washers, dish washers, baths and lavatories. I have thus eliminated the expensive heat exchangers with their associated losses. Obviously, no heat exchanger is 100% efficient.

I prevent water from freezing on those occasions when the outside temperature might cause a freeze problem in the solar tubes by circulating hot water from a supplemental heater through the tubes. Obviously, this entails a certain heat loss. However, I have found that in large portions of the United States and other places adaptable for the use of solar heating that this use of hot water to prevent the tubes from freezing is not a significant heat loss on an annual basis. By using the heat directly from the solar panels into only one single fluid, I find that I can greatly reduce the absorption area for absorbing the solar radiation.

In addition to this, I operate on a single pass system. I.e., all of the water tubes in the solar absorption areas are parallel. If the fluid can be increased in temperature a small amount each pass through, the cumulative temperature is sufficient to effectively operate the system.

Therefore, it may be seen the total function of the system is far greater than the function of the individual solar panels, pumps, controls, etc.

(2) Objects of the Invention

An object of this invention is to provide hot domestic water from solar radiation.

Further objects are to achieve the above with equipment that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, which is not a scale drawing.

BRIEF DESCRIPTION OF THE DRAWING

The drawing is schematic representation of an embodiment of this invention within a house shown in phantom lines with portions of the solar panel broken away for clarity.

DESCRIPTION OF THE PREFERRED EMBODIMENT

A source of pressurized potable water 10 is fed by check valve 12 into inlet 14 of solar water tubes 16 within solar panel 18. It will be understood, of course, that the solar panel could take many different forms, however, I prefer to use solar panels as particularly disclosed in my above noted patent application, filed concurrently herewith.

It will be understood that the solar panels transfer radiant heat from the sun to the solar water tubes 16. Conveniently, they are located upon the roof 20 of the house.

The water from the inlet 14 enters through inlet header 22. Temperature sensor 24 is located within the inlet header 22. The pipes 16 extend to outlet header 26 and the outlet temperature sensor 28 is located in the outlet header, which in affect is at outlet 30 of the solar tubes.

The outlet 30 is connected to solar water storage tank 32. Top temperature sensor 34 is located upon the top of the solar tank 32 and bottom temperature sensor 36 is located in the bottom of the solar tank 32. The top of the solar tank is connected to tank tee 38.

The tank tee 38 is connected to supplemental water heater 40. The supplemental water heater 40 is a conventional water heater using a non-solar heat source, such as electric or natural gas. The outlet of the supplemental heater 40 is connected to domestic loop 42. The domestic loop 42 is the loop which goes to hot water tap tees 44 and to space heaters 46.

The hot water tap tees lead to hot water taps located either at baths, lavatories, dish washers, clothes washers and the like. The space heaters 46 transfer heat from the water within the domestic loop 42 to interior spaces, i.e., the rooms of the house under the roof 20. Obviously, heaters 46 may be of many different types either radiators or units having fans in them. If units with fans are used the fan may be thermostatically controlled to circulate air around finned water tubes within heaters 46 as the space needs heating. If chosen, radiators may be controlled by-passing the water through by-pass loop 48 as controlled by three-way valve 50.

The by-pass loop 48 with the valve 50 is provided so that in the summertime the water is diverted around the heater 46 so that there is no heat addition to the interior space. The domestic loop terminates at loop tee 52. The domestic loop provides for circulation of water from the supplemental water heater 40 through all of the tap tees 44 and space heaters 46 in series.

Loop pump 54 is located within the domestic loop adjacent to the loop tee 52. The loop pump 54 operates at all times so that it continuously circulates water, maintaining a flow rate in the domestic loop of about 115 liters (30 gal.) per minute. The flow from the supplemental water heater 40 might be greater than the flow through the pump if some of the water is being diverted from the loop at one of the tap tees 44.

The loop tee 52 is directly connected by a short pipe to the tank tee 38. The loop tee 52 is also connected to transfer pump 55 through check valve 56. The flow rate of the transfer pump is about 100 liters per minute. The flow rate of the loop pump is greater than the flow rate of the transfer pump. When the transfer pump is running nearly all of the flow of water will be from the loop tee into the solar panels 18 as described hereinafter. However, if the transfer pump is not running the flow will be from the domestic loop back into the supplemental heater 40. The output of the transfer pump 55 is to the inlet 14 of the solar tubes 16. Actually as may be seen in the drawing, the output of the transfer pump 55 is through transfer tee 57 which is connected in a line which also is adjacent to the cold water tee 58 whereby source of pressurized potable water 10 enters the system.

The transfer pump 55 is controlled by transfer controller 60. The transfer controller 60 receives temperature from the top temperature sensor 34 on the solar tank 32 and also from the inlet temperature sensor 24 located at the inlet of the water to the solar tubes 16. The transfer pump 55 runs at all times except when the temperature of the water in the solar tank 32 is below 65° C. (150° F.) and when the temperature of the inlet water to tube 16 is above 5° C. Stated otherwise, it may be seen that unless the water in the solar tank is at least 65° C. the water will not be circulated from the solar tank into the domestic loop on a normal basis but the water in the domestic loop will merely be recirculated. Any time the solar tubes 16 are in danger of freezing the water will be circulated from the domestic loop into the solar panel to prevent freezing.

Solar pump 62 is connected by check valve 64 to the bottom of solar tank 32. The outlet of the solar pump 62 is the inlet 14 of the solar tube 16. As may be seen in the drawing, the outlet of the pump 62 is connected into the transfer tee 57. The solar pump 62 is controlled by controller 66 which receives an input from the outlet temperature sensor 28 and the inlet temperature sensor 24 as well as an input from the bottom temperature sensor 36 on the solar tank 32. Solar pump 62 runs all of the time, unless the difference between the inlet temperature as sensed at 24 and the outlet temperature as sensed at 28 is less than 1.5° C. and also the temperature at the solar tank 34 is above 5° C. Stated otherwise, the solar pump 62 operates if it can increase the water temperature as much as 1.5° C. going through the solar panel 18 and also it operates if there is any danger of the solar tank 32 freezing.

Solar pump 62 is a variable speed pump. As controlled by its controller 66 it has a very low speed when the temperature difference between the inlet and outlet of the solar panels 18 is small and increases its flow rate as the temperature differential increases. As more radiant heat is being absorbed by the water within the solar panel 18, more water is circulated through the solar tubes 16.

Therefore, it may be seen I have provided a simple, economical system to heat water for domestic purposes.

As an aid to correlating the terms of the claims to the exemplary drawing, the following catalog of elements is provided:

10 pressurized potable water
12 check valve
14 inlet
16 solar water tubes
18 solar panel
20 roof
22 inlet header
24 temperature sensor
26 outlet header
28 temperature sensor
30 outlet
32 solar water storage tank
34 top temperature sensor
36 temperature sensor
38 tank tee
40 supplemental water heater
42 domestic loop
44 hot water tap tees
46 space heaters
48 by-pass loop
50 three-way valve
52 loop tee
54 loop pump
55 transfer pump
56 check valve
57 transfer tee
58 cold water tee
60 transfer controller
62 solar pump
64 check vavle
66 controller The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of t! is patent would be, but are to enable the reader to make and use the invention.

I claim as my invention:

1. In a solar water heating system having
   a. solar panels which transfer radiant heat from the sun to solar water tubes therein,
   b. the solar tubes having
      (i) inlets, and
      (ii) outlets,
   c. a solar water storage tank, d. a supplemental water heater using a non-solar heat source,
e. at least one space heater which transfers heat from water therein to interior spaces,
f. at least one hot water tap tee which supplies hot water to washers, baths and lavatories, and
g. a source of pressurized portable water, the improved connections and controls comprising in combination:
h. the source of water connected to the inlet of the solar tubes,
j. the outlet of the solar tubes connected to the solar tank,
k. the solar tank connected to
m. a tank tee,
n. the tank tee connected to the supplemental heater,
o. the supplemental heater connected through all the space heaters and tap tees in series to
p. a loop tee,
q. the loop tee connected to the inlet of the solar tubes,
r. the loop tee directly connected by a short pipe to the tank tee, and
ss. a transfer pump located within the connection between the loop tee and the inlet of the solar tubes.

2. The invention as defined in claim 1 with the additional limitation of
s. a loop pump connected between the tap tees and loop tee adjacent to the loop tee.

3. The invention as defined in claim 1 with the additional limitation of
t. means for deactivating the transfer pump if
(i) the temperature of the solar tank is under 65° C., and
(ii) the temperature of the inlet of the solar tubes is above 5° C.

4. The invention as defined in claim 1 with additional limitation of
s. a solar pump connecting the bottom of the solar tank to the inlet of the solar tubes.

5. The invention as defined in claim 5 with the additional limitation of
t. means for deactivating the solar pump if
(i) the temperature at the outlet of the solar tubes is not at least 1.5° C. above the inlet of the solar tubes, and
(ii) the temperature of the bottom of the solar tank is above 5° C.

6. The invention as defined in claim 6 with additional limitation of
u. means for increasing the flow rate of the solar pump responsive to an increase in the temperature differential between the inlet and the outlet of solar tubes.

7. The invention as defined in claim 1 with additional limitations of
s. a loop pump connected between the tap tees and the loop tee, and
u. said loop pump having a greater flow rate than the transfer pump.

8. The invention as defined in claim 7 with the additional limitation of
v. means for deactivating the transfer pump if
(i) the temperature of the solar tank is under 65° C., and
(ii) the temperature of the inlet of the solar tubes is above 5° C.

9. The invention as defined in claim 9 with additional limitations of
w. a solar pump connecting the bottom of the solar tank to the inlet of the solar tubes,
x. means for deactivating the solar pump if
(i) the temperature at the outlet of the solar tubes is not at least 1.5° C. above the inlet of the solar tubes, and
(ii) the temperature of the bottom of the solar tank is above 5° C.,
y. means for increasing the flow rate of the solar pump responsive to an increase in the temperature differential between the inlet and the outlet of solar tubes.

* * * * *